US010093423B2

(12) United States Patent
Uriu et al.

(10) Patent No.: US 10,093,423 B2
(45) Date of Patent: Oct. 9, 2018

(54) PASSENGER SEAT FOR AIRCRAFT

(71) Applicant: JAMCO Corporation, Mitaka-shi, Tokyo (JP)

(72) Inventors: Tsukasa Uriu, Mitaka (JP); Nozomu Tagami, Mitaka (JP); Masaji Ozaki, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 66 days.

(21) Appl. No.: 15/506,091

(22) PCT Filed: Aug. 28, 2014

(86) PCT No.: PCT/JP2014/072522
§ 371 (c)(1),
(2) Date: Feb. 23, 2017

(87) PCT Pub. No.: WO2016/031003
PCT Pub. Date: Mar. 3, 2016

(65) Prior Publication Data
US 2018/0215469 A1 Aug. 2, 2018

(51) Int. Cl.
*B64D 11/06* (2006.01)
(52) U.S. Cl.
CPC ........ *B64D 11/064* (2014.12); *B64D 11/0642* (2014.12); *B64D 11/0696* (2013.01)
(58) Field of Classification Search
CPC .............. B64D 11/064; B64D 11/0696; B64D 11/0642
USPC ..................................................... 244/122 R
See application file for complete search history.

(56) References Cited

U.S. PATENT DOCUMENTS

| 4,671,572 | A | * | 6/1987 | Young | A47C 3/18 |
| | | | | | 248/425 |
| 8,403,415 | B2 | * | 3/2013 | Lawson | B64D 11/06 |
| | | | | | 297/318 |
| 8,419,123 | B2 | * | 4/2013 | Hankinson | B64D 11/06 |
| | | | | | 297/118 |

(Continued)

FOREIGN PATENT DOCUMENTS

JP        2004-81263 A        3/2004

OTHER PUBLICATIONS

Notification of Reasons for Refusal dated Oct. 6, 2015, issued in counterpart Japanese Patent Application No. 2015-512963, w/English translation (4 pages).

(Continued)

*Primary Examiner* — Brian M O'Hara
*Assistant Examiner* — Keith L Dixon
(74) *Attorney, Agent, or Firm* — Westerman, Hattori, Daniels & Adrian, LLP

(57) ABSTRACT

A passenger seat 100 for an aircraft, including a seat bottom frame 210, a backrest frame 220 and a headrest frame 230 that constitute a reclining assembly, which are supported by a spreader 170 and pipes 130 and 132 fastened to a floor by seat track fittings 110, the pipes 130 and 132 passing through left and right legs 120. A direct-acting-type damper 300 is attached to the backrest frame 230, and an extension member 400 is attached to the headrest frame 230, whereby a structural design is provided in which the reclining assembly, the direct-acting-type damper and the extension member can be easily replaced.

9 Claims, 12 Drawing Sheets

(56) References Cited

U.S. PATENT DOCUMENTS

| | | | |
|---|---|---|---|
| 9,731,830 B2* | 8/2017 | Ozaki | B64D 11/0642 |
| 2003/0080597 A1 | 5/2003 | Beroth et al. | |
| 2010/0308167 A1* | 12/2010 | Hawkins | B60N 2/181 |
| | | | 244/122 R |
| 2011/0101751 A1* | 5/2011 | Meister | B64D 11/06 |
| | | | 297/319 |
| 2013/0009435 A1* | 1/2013 | Westerink | B60N 2/1625 |
| | | | 297/313 |

OTHER PUBLICATIONS

Decision to Grant a Patent dated Feb. 2, 2016, issued in counterpart Japanese Patent Application No. 2015-512963, w/English translation (6 pages).

International Search Report dated Nov. 25, 2014, issued in counterpart International Application No. PCT/JP2014/072522, w/English translation (3 pages).

Written Opinion dated Nov. 25, 2014, issued in counterpart International Application No. PCT/JP2014/072522, w/English translation (6 pages).

* cited by examiner

A-A

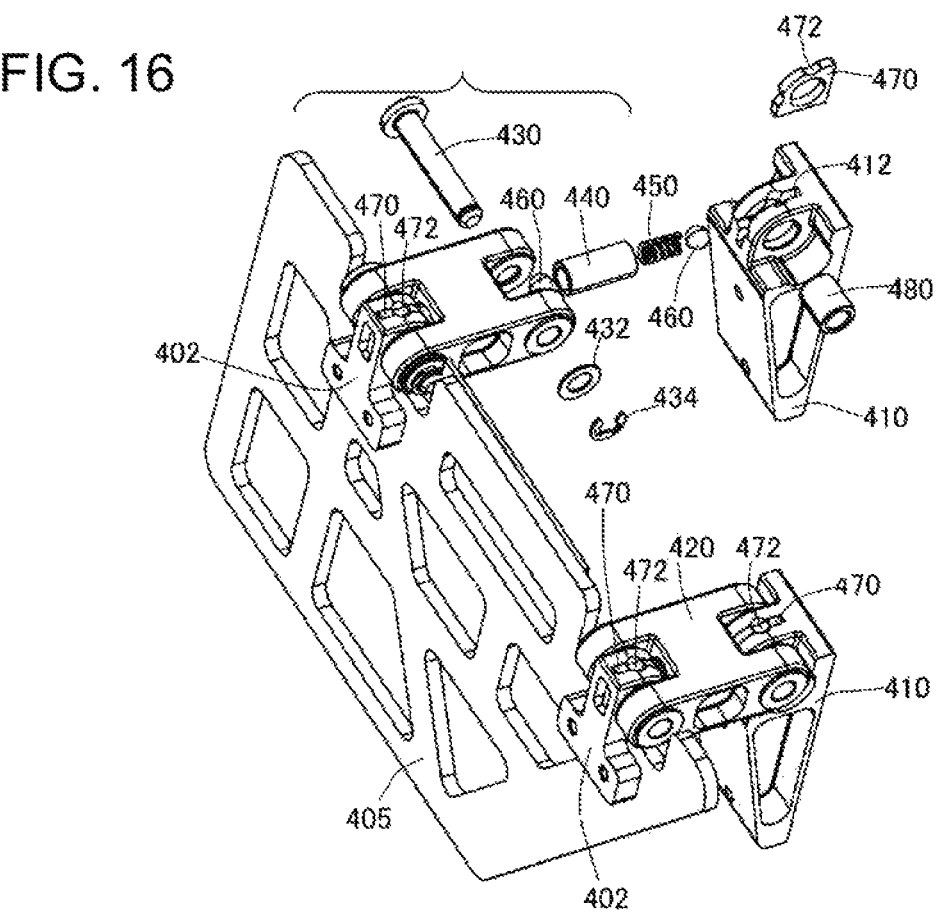

PASSENGER SEAT FOR AIRCRAFT

TECHNICAL FIELD

The present invention relates to a passenger seat for an aircraft having an improved maintainability.

BACKGROUND ART

Recently, many passenger seats on an aircraft are movable, and are equipped with functions such as a reclining function. Consumption of components constituting movable portions is inevitable, since the components are moved in sliding motion, and load on the components increases and decreases. In many cases, the seats on the aircraft are used continuously for a few years to even over ten years by subjecting the seats to maintenance operations, and the consumed parts are often replaced. Normal maintenance is performed while an airframe is landed at an airport during flight operation, so that the time that can be used for replacing the components is short, and the replacement operation must be performed within a limited narrow space within a cabin of the aircraft.

A prior art passenger seat of an aircraft proposes providing a movable portion retained in a state sandwiched between spreaders, serving as a pair of frame bodies arranged on both sides of the seat, and that moves within a groove formed on the spreaders, to recline or change positions of the seat (Patent Literature 1).

CITATION LIST

Patent Literature

[PTL 1] Japanese Unexamined Patent Application Publication No. 2004-81263

SUMMARY OF INVENTION

Technical Problem

In the case of a seat structure disclosed in Patent Literature 1, the two spreaders must maintain a certain mutual distance, and the spreaders are required to be fixed firmly to the airframe via tubes or fittings, to support the weight of the passenger applied on the movable portion.

Therefore, the operation of removing the spreaders in a short time and the operation of attaching the removed spreaders again at a correct distance and in a correct parallel relationship are difficult. Further, the operation may lead to a large-scale operation, such as having to remove an exterior member in order to remove the spreader.

Especially, the components of the movable portion predicted to be consumed are required to be replaced with a more simple operation.

The object of the present invention is to provide a passenger seat for an aircraft considering maintainability, by configuring a reclining assembly constituting the passenger seat for an aircraft that can be easily removed from and attached to a spreader, predicting consumption of structural members such as a direct-acting-type damper attached to a backrest or a hinge of a headrest extension member, and adopting a structure where the members can easily be replaced.

Solution to Problem

In order to solve the above-described object, the passenger seat for an aircraft according to the present invention provides, as basic means, a pair of legs attached via fittings to a seat track on a floor surface of the aircraft, two pipes respectively fixed to a front and a rear of the legs, and a spreader serving as a frame fixed to the two pipes and supporting a reclining assembly of the seat, wherein the reclining assembly includes a seat bottom frame, a backrest frame and a headrest frame, the spreader having grooves receiving cam followers provided on both sides of the reclining assembly, and a cover covering an opening portion provided on an upper portion of the groove configured to allow attachment and detachment of the cam followers.

Further, the cover adopts a shape that prevents the cover from falling into the groove.

Further, the reclining assembly includes a direct-acting-type damper attached to a side portion of the backrest frame, and the direct-acting-type damper is a gas damper.

A pin attaching the direct-acting-type damper to the backrest frame has a leading end portion having a tapered surface.

Further, the reclining assembly includes an extension member provided at a leading end of a headrest frame, and the extension member is attached pivotably via a pivoting hinge to the headrest frame.

The pivoting hinge includes a ball pressed by a spring, a pipe-shaped bushing into which the spring is inserted, and a cam plate having a dent receiving the ball, wherein the cam plate is attached via a pin, and wherein the ball, the bushing and the cam plate are formed of a metal having a high hardness.

Advantageous Effects of Invention

The passenger seat for an aircraft according to the present invention adopts the above-described configuration, so that maintenance operation can be facilitated, and service life of the product can be extended.

BRIEF DESCRIPTION OF DRAWINGS

FIG. 16 is an explanatory view of a member of the passenger seat for an aircraft according to the present invention.

DESCRIPTION OF EMBODIMENTS

Figure 1:
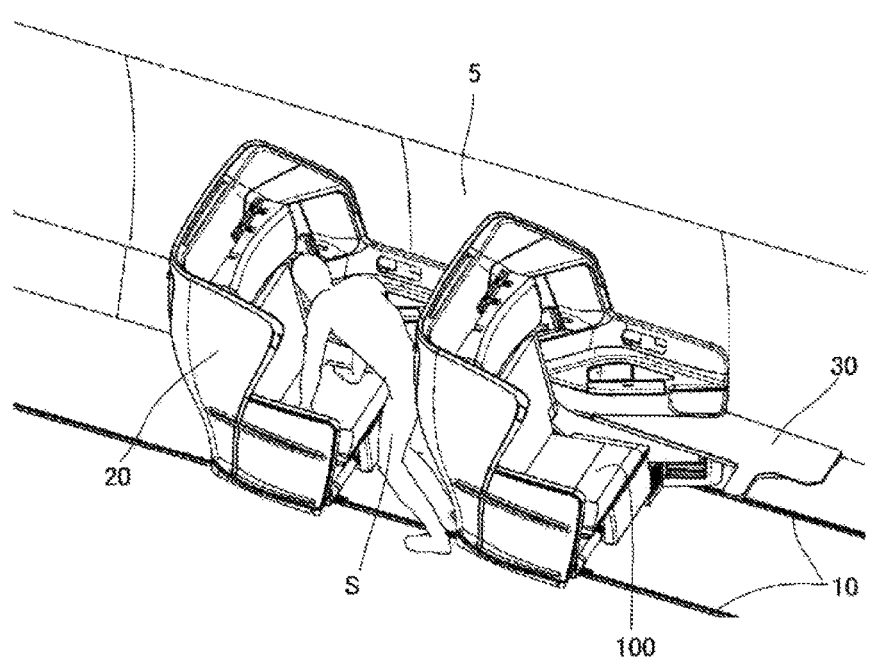
FIG. 1 is an explanatory view illustrating an arrangement of a passenger seat for an aircraft according to the present invention.
Figure 2:
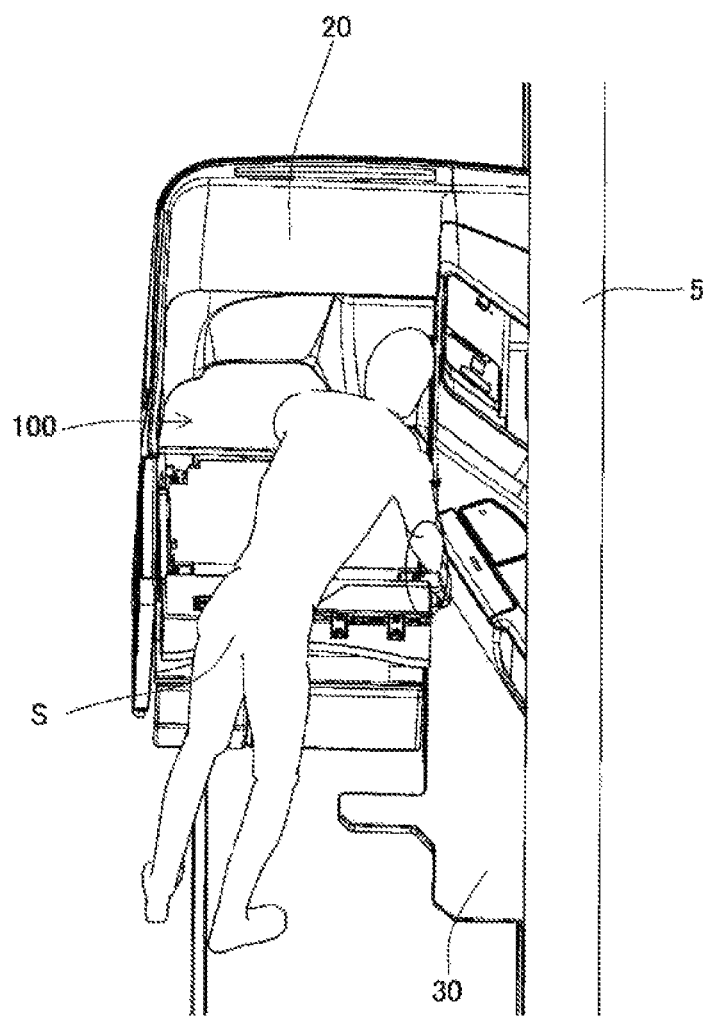
FIG. 2 is an explanatory view illustrating an arrangement of a passenger seat for an aircraft according to the present invention.

FIGS. 1 and 2 are explanatory views illustrating an arrangement of a passenger seat for an aircraft according to the present invention. A passenger seat for an aircraft denoted as a whole by reference number 100 is attached to seat tracks 10 laid on a floor of the aircraft. Each passenger seat 100 for an aircraft is surrounded by a back shell 20, provided with an ottoman 30, and arranged adjacent to a wall 5 of the aircraft.

A mechanic S must perform maintenance of the passenger seat 100 for an aircraft within a limited space.

Figure 3:
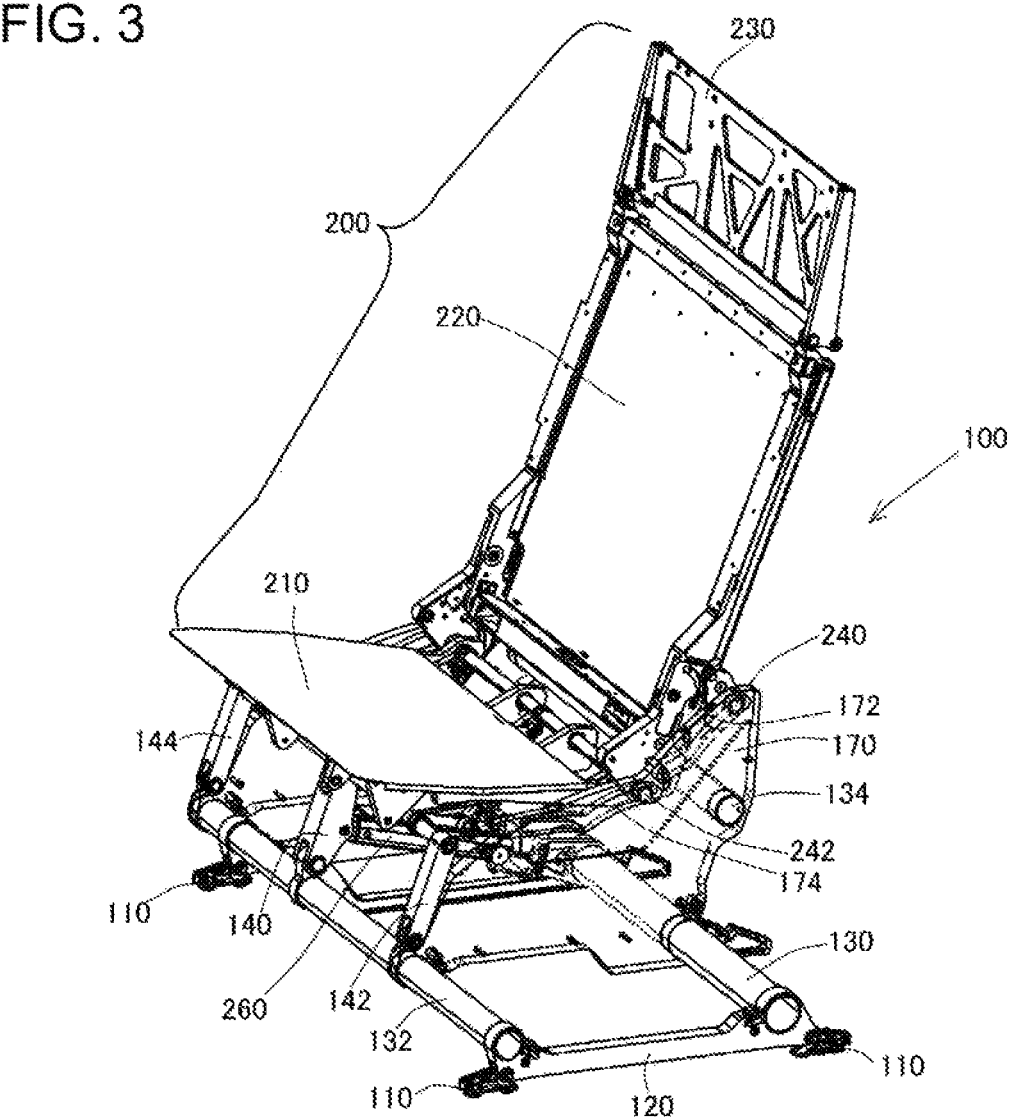
FIG. 3 is a perspective view taken from a front side of the passenger seat for an aircraft according to the present invention.
Figure 4:
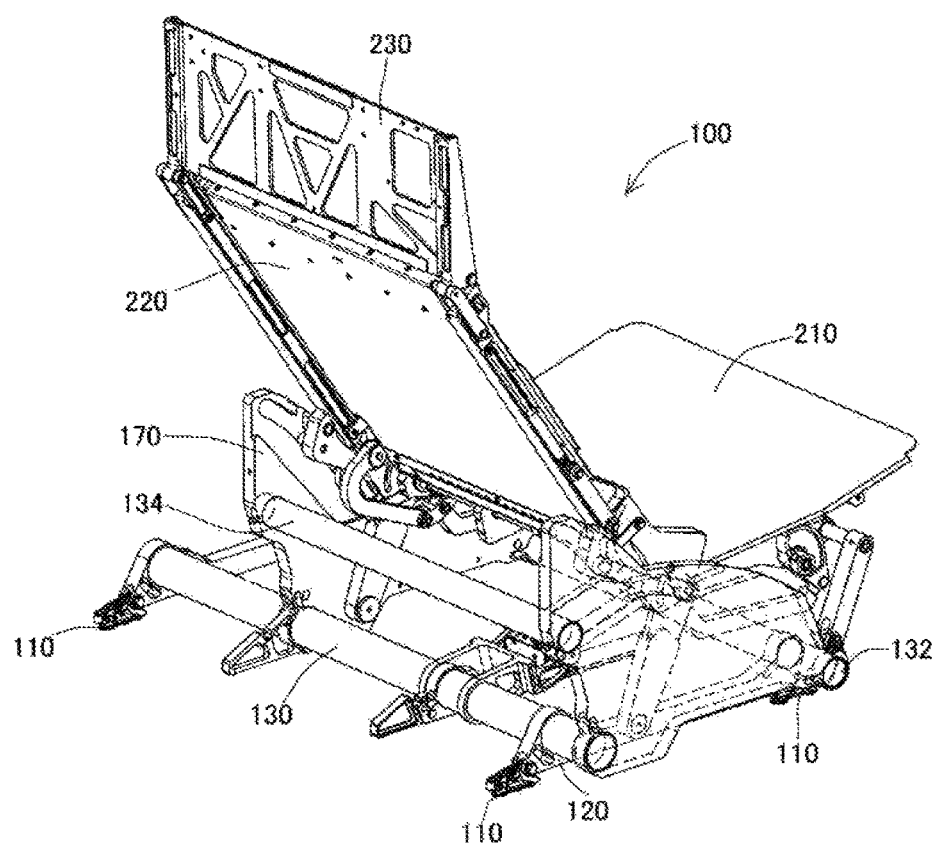
FIG. 4 is a perspective view taken from a rear side of the passenger seat for an aircraft according to the present invention.
Figure 5:
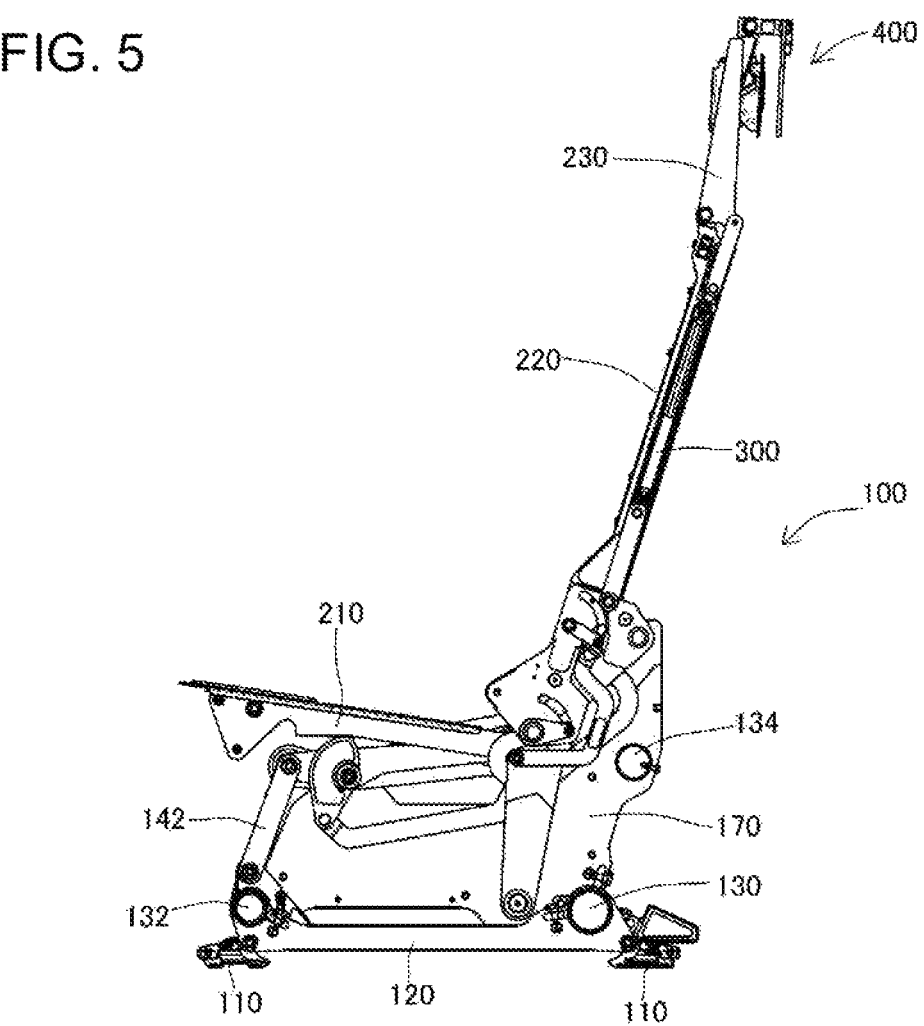
FIG. 5 is a side view of the passenger seat for an aircraft according to the present invention.

FIGS. 3, 4 and 5 are explanatory views illustrating an outline of the passenger seat for aircraft according to the present invention.

The passenger seat 100 for an aircraft is attached via seat track fittings 110 fixed to the seat tracks 10 disposed on a floor of the aircraft. The seat track fittings 110 disposed in front of and behind the passenger seat support legs 120, and the left and right legs 120 are connected by two pipes 130 and 132.

A reclining assembly (assembly) 200 is composed of a seat bottom frame 210 on which a passenger is to be seated, a backrest frame 220 supporting a back of the passenger, and a headrest frame 230 supporting a head portion of the passenger. The reclining assembly (assembly) 200 is supported reclinably by a pair of spreaders 170 that serve as a pair of frame bodies arranged on both sides of the assembly.

The pair of spreaders 170 are coupled via a pipe 134.

The reclining assembly (assembly) 200 includes cam followers 240 and 242 engaged with grooves 172 and 174 formed on the spreader 170, and moves in reclining motion. The reclining motion is driven by a direct-acting-type actuator 260.

The actuator 260 drives a link plate 140, and moves the reclining assembly (assembly) 200 back and forth. The cam followers 240 and 242 move within the grooves 172 and 174 on the spreader 170, and reclines the reclining assembly (assembly) 200. Arms 142 and 144 are arranged on left and right sides of the link plate 140.

Figure 6:
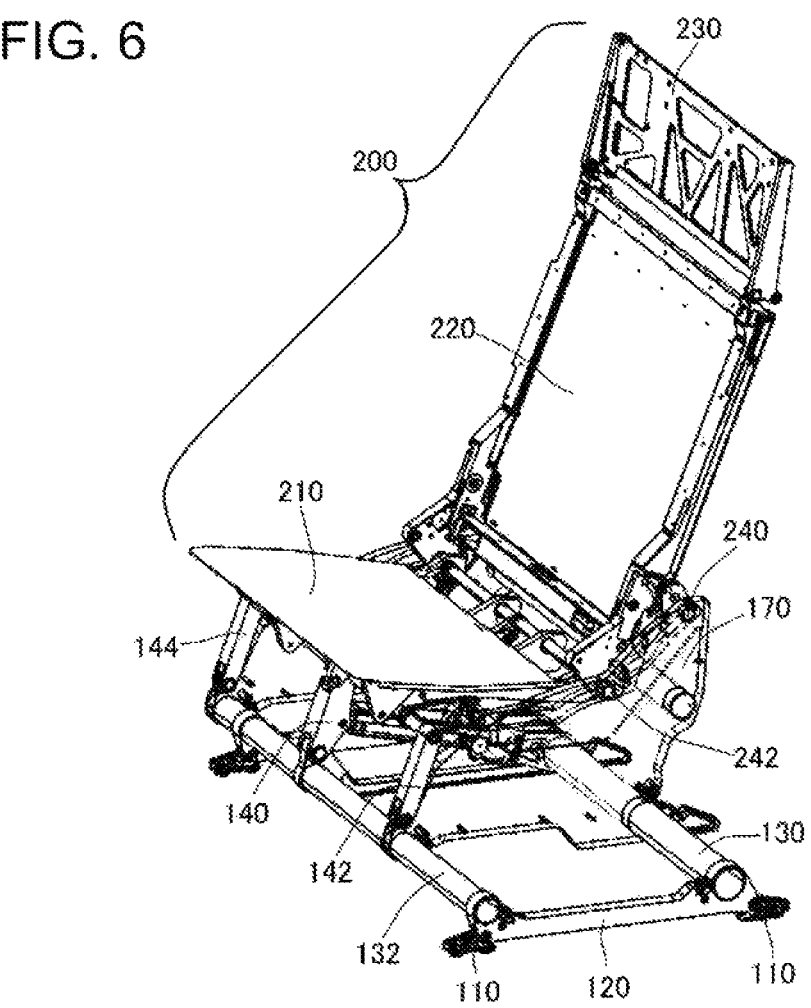
FIG. 6 is an explanatory view illustrating a removal of the passenger seat for an aircraft according to the present invention.
Figure 7:
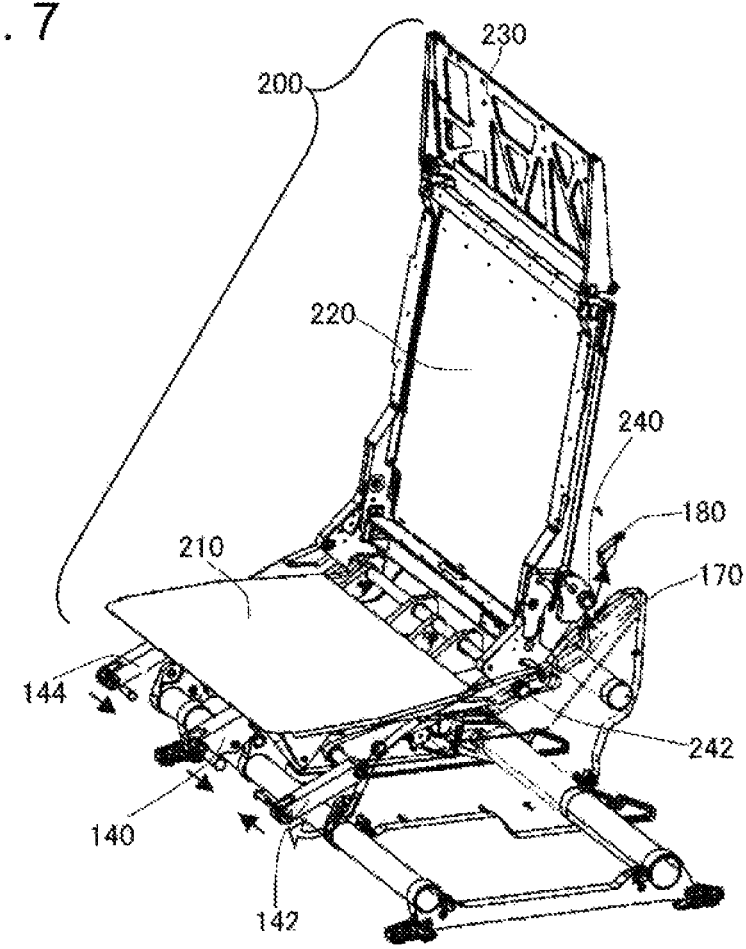
FIG. 7 is an explanatory view illustrating a removal of the passenger seat for an aircraft according to the present invention.
Figure 8:
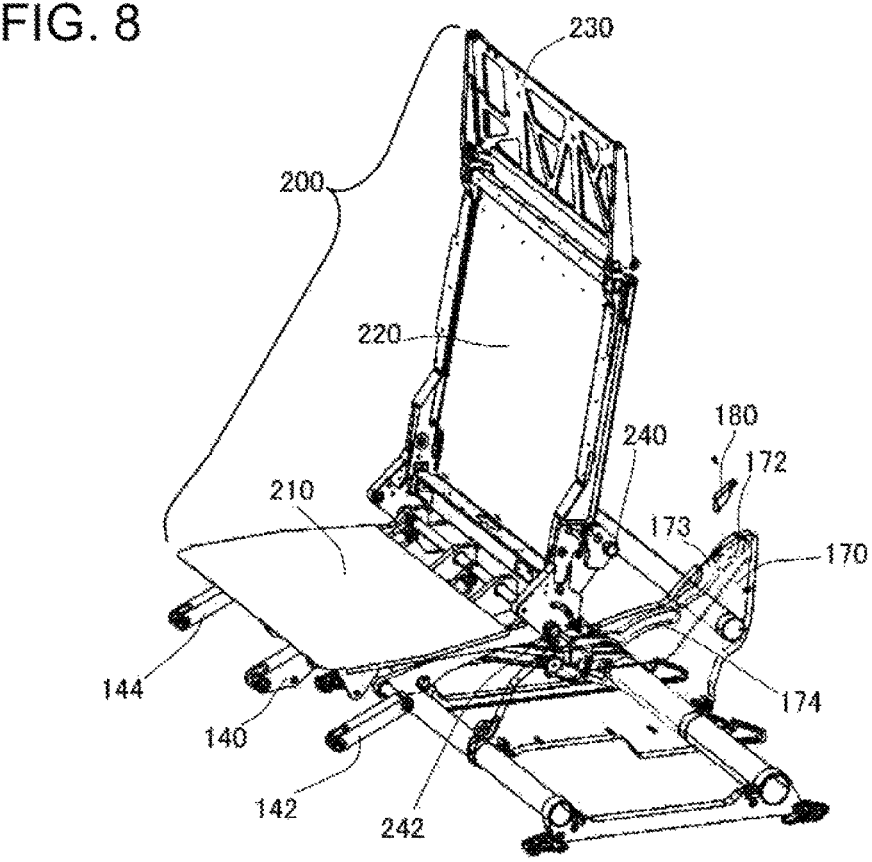
FIG. 8 is an explanatory view illustrating a removal of the passenger seat for an aircraft according to FIG. 8.

FIGS. 6, 7 and 8 illustrate steps for removing the reclining assembly (assembly) 200.

The spreader 170 includes a rear groove 172 and a front groove 174. The rear groove 172 has an opening portion 173 opening upward, and the front groove 174 is opened frontward.

Figure 9:
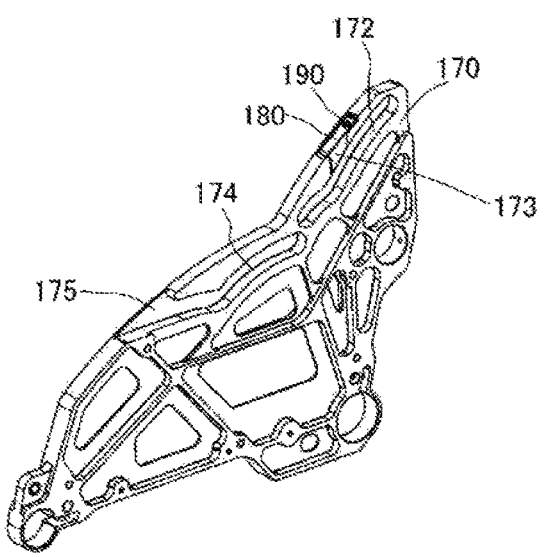
FIG. 9 is a perspective view of a member of the passenger seat for an aircraft according to the present invention.
Figure 10:
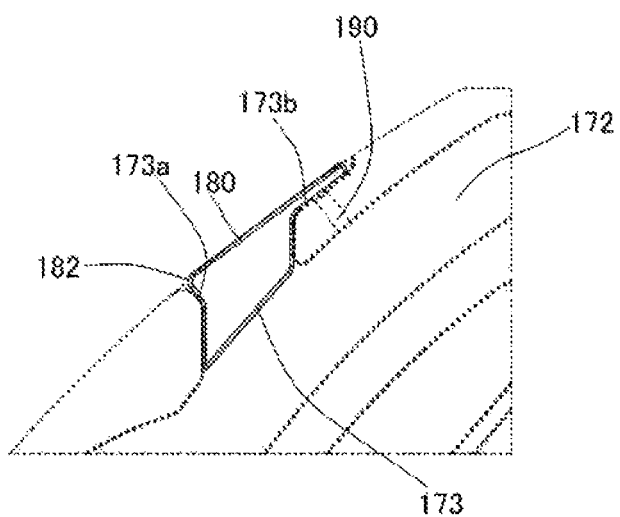
FIG. 10 is an enlarged view of a relevant portion of FIG. 9.
Figure 11:
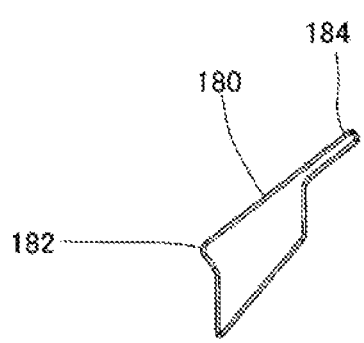
FIG. 11 is a partial view of FIG. 10.

FIGS. 9 through 11 illustrate the details of the grooves and a cover.

The opening portion 173 of the rear groove 172 is covered by a cover 180, and the cover is fixed by a screw 190.

In order to remove the reclining assembly (assembly) 200, at first, coupling portions between the link plate 140 and the two arms 142 and 144 are disengaged.

Next, the screw 190 of the cover 180 covering the opening portion 173 of the spreader 172 is disengaged and removed from the cover 180.

The whole reclining assembly (assembly) 200 is held by hand, and the rear cam follower 240 is passed through the opening portion 173 of the groove 172 and removed upward. The front cam follower 242 is passed through a front opening 175 of the groove 174, and the reclining assembly (assembly) 200 is removed.

Edge portions 173a and 173b are provided on an upper surface of the opening portion 173 of the groove 172. The rear edge portion 173b is designed so that a mounting surface 184 for the screw 190 of the cover 180 can be placed thereon. A joining portion 182 of the cover 180 engaged with the front edge portion 173a is formed to have a curved surface opening to the outer side. This configuration prevents the removed cover 180 from falling into the groove 172.

The passenger seat 100 for an aircraft according to the present invention having the above-described configuration enables the reclining assembly (assembly) 200 to be attached to and detached from the spreader 170 easily without having to remove the spreader 170. As a result, maintenance operation can be performed efficiently.

The passenger seat 100 for an aircraft according to the present invention can be converted into a bed mode by tilting the backrest frame 220 frontward. A direct-acting-type damper is provided to prevent the backrest frame 220 from tilting suddenly and to support the power to draw the back rest frame 220 up from the bed mode.

A gas damper is used, for example, as the direct-acting-type damper.

Figure 12:
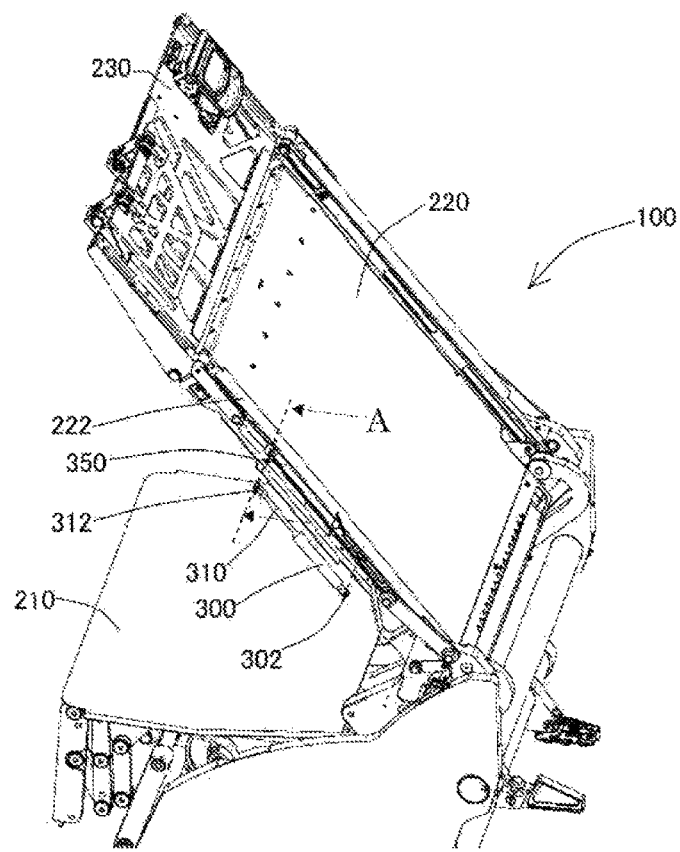
FIG. 12 is a perspective view taken from a rear portion of the passenger seat for an aircraft according to the present invention.
Figure 13:
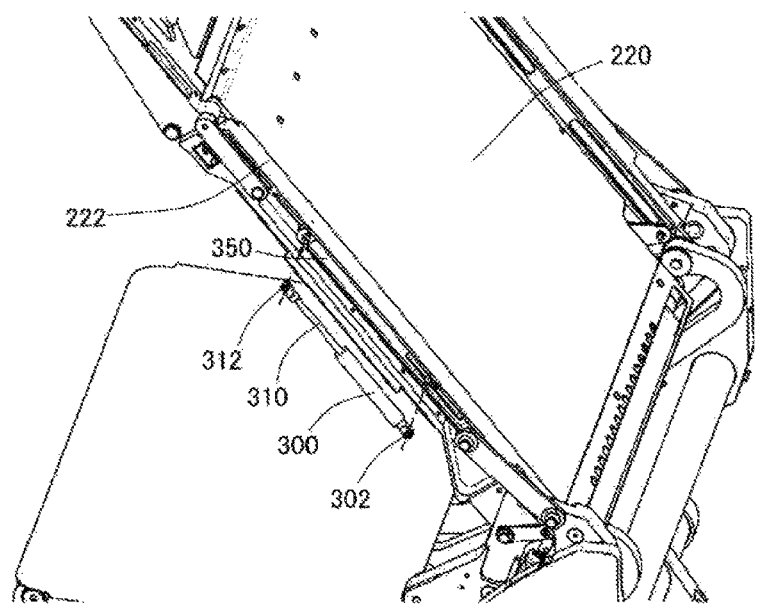
FIG. 13 is an enlarged view of FIG. 12.
Figure 14:
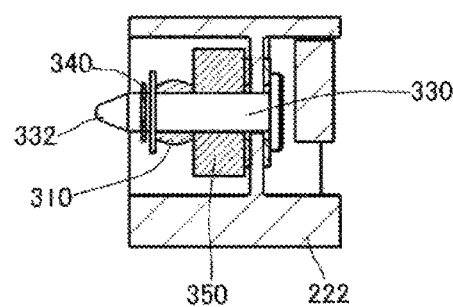
FIG. 14 is an arrow view taken at A-A of FIG. 12.

FIGS. 12 through 14 illustrate a direct-acting-type damper 300.

A link frame 350 is arranged along a side frame 222 of the backrest frame 220. An end portion 302 of a cylinder of the direct-acting-type damper 300 is attached to the side frame 222 via a pin 330. An end portion 312 of a piston 310 of the direct-acting-type damper 300 is attached to the link frame 350 via the pin 330. The pin 330 is retained by a snap ring 340. In a state where the backrest frame 220 is tilted frontward, a link plate 350 moves toward a direction compressing the direct-acting-type damper 300, by which the direct-acting-type damper 300 stores energy.

FIG. 2 illustrates a state where the mechanic S is replacing the direct-acting-type damper 300.

Since the seat is surrounded by a back shell 20, the mechanic cannot access the damper when the passenger seat 100 for an aircraft is positioned at an upright position, so the seat must be tilted somewhat frontward to allow access to the damper through the space between the backrest and the back shell. As for the seat placed adjacent to the wall of the aircraft, the damper cannot be visually observed directly, since there is a wall.

Furthermore, in a state where the back rest is tilted somewhat frontward, the direct-acting-type damper 300 is contracted and exerts resilience. Therefore, during attachment, the direct-acting-type damper 300 must be retained in the contracted state, so it is difficult to carry out the operation in a narrow space where visual confirmation is not possible.

Therefore, as illustrated in FIG. 14, a tapered portion 332 is provided at a tip of the pin 330 fixing the direct-acting-type damper 300. According to this structure, even if the mounting portion cannot be visually confirmed, or even if the direct-acting-type damper 300 is to be attached while maintaining a contracted state, the damper can be attached easily with only one hand. Therefore, the maintenance operation can be facilitated.

The passenger seat 100 for an aircraft according to the present invention can be used in the bed mode, by tilting the backrest frame 220 and the headrest frame 230 frontward.

As illustrated in FIG. 5, an extension member 400 used during the bed mode is provided on a rear surface of the headrest frame 230.

Figure 15:
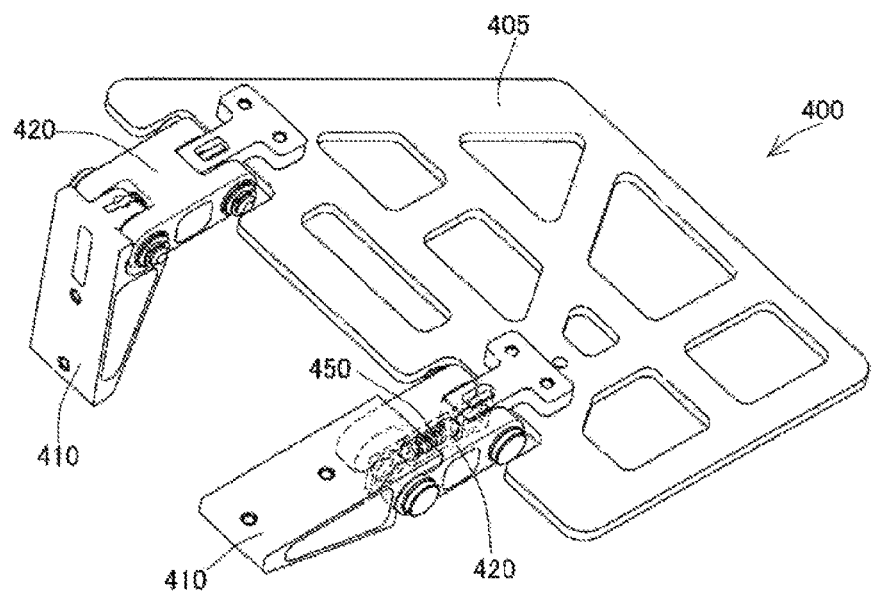
FIG. 15 is an explanatory view of a member of the passenger seat for an aircraft according to the present invention.

FIGS. 15 and 16 illustrate details of the extension member 400.

The extension member 400 is attached pivotably to a rear surface of the headrest frame 230 by fixing an extension panel 405 using a fixed hinge 410 and a pivoting hinge 420.

The fixed hinge 410 is fixed to a rear surface of the headrest frame 230, and one end portion of the pivoting hinge 420 is pivotably connected to the fixed hinge 410. The extension panel 405 is pivotably connected the other end portion of the pivoting hinge 420 via a bracket 402.

The fixed hinge 410 is formed of an aluminum material, so as to contribute to lighter weight. A groove 412 is formed at a center of the fixed hinge, and a cam plate 470 is inserted thereto. The cam plate 470 is formed of a stainless steel or other material having a high hardness, and has a dent 472 formed thereto.

The pivoting hinge 420 is formed of an aluminum material, and a pipe-shaped bushing 440 is inserted to an inner portion of the pivoting hinge 420. A spring 450 is arranged within the bushing 440, and the respective ends of the spring 450 push a ball 460. Each ball 460 is fit to the dent 472 of the cam plate 470, and maintains a rotation angle of the pivoting hinge 420. The bushing 440 and the spring 450 are formed of materials such as stainless steel and spring steel.

A bushing 480 penetrates the cam plate 470, and a pin 430 is inserted to the bushing, which is fixed via a washer 432 and a retaining ring 434.

The cam plate 470 can be replaced easily by pulling out the pin 430.

The coupling portion between the pivoting hinge 420 and the bracket 402 of the extension panel can adopt a similar configuration.

The seat according to the present invention realizes lighter weight, by only using heavy material such as steel to form portions, such as balls and springs, where abrasion occurs by action, and mainly using aluminum to form other structural members.

Further, the members that must be replaced when abrasion occurs are downsized, to reduce the amount of consumables. Further, the service life of the seat as a whole can be extended by considering the abrasion caused by the friction between the springs and the surrounding components, and facilitating the replacement of the bushing into which the spring is inserted.

The passenger seat for an aircraft according to the present invention is configured as above, so that the replacement and maintenance of the reclining assembly and the direct-acting-type damper can be facilitated. Moreover, the configuration and the material of components of the pivoting hinge attached to the extension member and maintaining the angle of the extension member are devised, so that the weight of the whole extension member can be reduced, and an effect is realized where maintenance such as the replacement of members can easily be performed.

REFERENCE SIGNS LIST

5 Aircraft wall
10 Seat track
20 Back shell
30 Ottoman
100 Passenger seat for aircraft
110 Seat track fittings
120 Leg
130 Pipe
132 Pipe
134 Pipe
140 Link plate
142 Arm
144 Arm
170 Spreader
172 Rear groove (slit)
142 Front groove (slit)
180 Cover
200 Reclining assembly (assembly)
210 Seat bottom frame
220 Backrest frame
230 Head rest frame
240 Cam follower
242 Cam follower
300 Direct-acting-type damper
330 Pin
400 Extension member
405 Extension panel
410 Fixed hinge
420 Pivoting hinge
430 Pin
450 Spring
460 Ball
470 Cam plate

The invention claimed is:

1. A passenger seat for an aircraft comprising:
a pair of legs attached via fittings to a seat track on a floor surface of the aircraft;
two pipes respectively fixed to a front and a rear of the legs; and
a spreader serving as a frame fixed to the two pipes and supporting a reclining assembly of the seat,
wherein the reclining assembly comprises a seat bottom frame, a backrest frame and a headrest frame, the spreader comprising grooves receiving cam followers provided on both sides of the reclining assembly, and a cover covering an opening portion provided on an upper portion of the groove configured to allow attachment and detachment of the cam followers.

2. The passenger seat for an aircraft according to claim 1, wherein the cover comprises a shape that prevents the cover from falling into the groove.

3. The passenger seat for an aircraft according to claim 1, wherein the reclining assembly comprises a direct-acting-type damper attached to a side portion of the backrest frame.

4. The passenger seat for an aircraft according to claim 3, wherein the direct-acting-type damper is a gas damper.

5. The passenger seat for an aircraft according to claim 3, wherein a pin attaching the direct-acting-type damper to the backrest frame comprises a leading end portion comprising a tapered surface.

6. The passenger seat for an aircraft according to claim 1, wherein the reclining assembly comprises an extension member provided at a leading end of a headrest frame, and the extension member is attached pivotably via a pivoting hinge to the headrest frame.

7. The passenger seat for an aircraft according to claim 6, wherein the pivoting hinge comprises a ball pressed by a spring, a pipe-shaped bushing into which the spring is inserted, and a cam plate comprising a dent receiving the ball.

8. The passenger seat for an aircraft according to claim 7, wherein the cam plate is attached via a pin.

9. The passenger seat for an aircraft according to claim 7, wherein the ball, the bushing and the cam plate are formed of a metal having a higher hardness than the pivoting hinge.

\* \* \* \* \*